Aug. 18, 1931.  J. BUCCOLA  1,819,671
ELECTRIC SOLDERING IRON
Filed May 16, 1930
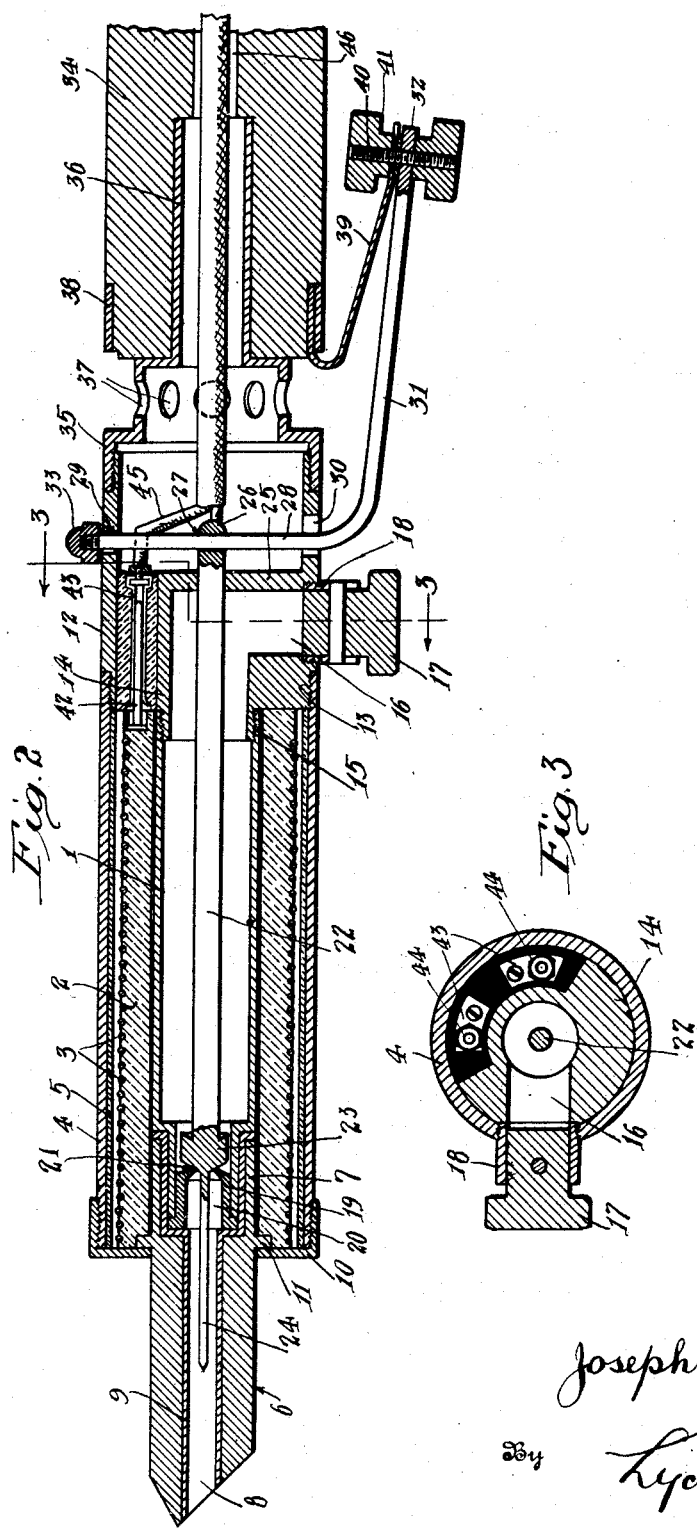
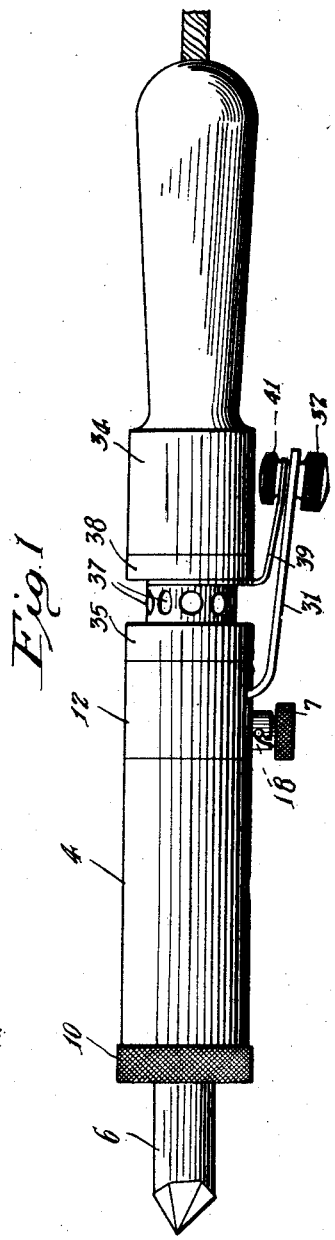
Inventor
Joseph Buccola
By Lyon+Lyon
Attorneys

UNITED STATES PATENT OFFICE

JOSEPH BUCCOLA, OF LOS ANGELES, CALIFORNIA, ASSIGNOR TO NATIONAL SELF-FEEDING IRON COMPANY, INCORPORATED, OF LOS ANGELES, CALIFORNIA

ELECTRIC SOLDERING IRON

Application filed May 16, 1930. Serial No. 452,948.

This invention relates to an improved soldering iron capable of retaining a quantity of solder and of feeding the solder in regulatable quantities.

The invention particularly relates to a new and novel arrangement of elements whereby an electric soldering iron is produced, such iron being particularly designed to diseminate heat between the iron proper and the handle and concentrate the heat upon the solder and soldering point.

An object of this invention is to disclose and provide an electrically heated soldering iron capable of being filled with a large quantity of solder, such solder being reduced to a molten state within the iron, the device including means for positively feeding the molten solder in regulatable quantities to the point thereof.

Another object is to disclose and provide a portable electric soldering iron capable of being readily taken apart for cleaning purposes.

Another object is to disclose and provide a soldering iron provided with a self-cleaning, positively closing valve through which molten solder may be fed in regulatable quantities to the point thereof.

A still further object is to disclose and provide a soldering iron of simple construction and from which the heating element may be removed without the necessity of making or breaking electrical connections.

In describing the invention, reference will be had to the appended drawings which illustrate one preferred form of the device.

In the drawings:

Fig. 1 is a side elevation of the device.

Fig. 2 is an enlarged longitudinal section of a portion of the device.

Fig. 3 is a transverse section of the device taken along the plane 3—3 indicated in Fig. 2.

The device may be separated into three major portions, namely, the point and solder chamber, a body portion and a handle. The solder chamber may comprise a tubular metallic member 1 surrounded by a heating element such as a slay or composition cylinder 2, having a coil of resistance wire 3 mounted thereon. The heating element 2 may be covered by a housing 4, suitable insulating material such as mica 5 separating the heating element from the housing 4.

A suitable copper soldering point 6 may extend beyond the housing 4, a portion of the point 6, such as the cylindrical end 7, extending inwardly into overlapping relation with a portion of the solder chamber 1 and into contact with the heating element 2. The point 6 may be provided with a conduit 8 communicating with the solder chamber 1.

The interior of the conduit 8 of the point 6 may be lined with a bushing or sleeve 9 made of non-corrosive metal, such as an aluminum alloy or a nickle cromium alloy. The bushing or sleeve 9, as shown in the drawing, extends into contact with the solder chamber 1. The purpose of this non-corrosive bushing or sleeve 9 is to prevent molten solder from attacking or corroding the copper point 6 and forming a scale within the conduit 8.

The point 6 may be held in contact with the heating element 2 by suitable means carried by the housing 4, as for example, by means of a flanged collar 10 threadedly connected to the housing 4 and cooperating with an outwardly extending flange 11 formed on the point 6.

The body portion of the device may consist of a cylindrical member 12 adapted to receive and hold the housing 4 as by means of a threaded connection indicated at 13. The body portion 12 may include a conduit 14 communicating with the solder chamber 1. The solder chamber 1 may be threadedly connected to the body portion 12 as indicated at 15. The conduit 14 may be L-shaped and include a branch 16, said branch being provided with a closure member 17 adapted to be removably connected, as by means of a bayonet joint, with a collar 18 formed as a part of or attached to the body portion 12.

Positioned within the forward end of the reservoir or solder chamber 1 is a valve member 19 provided with a conduit 20 substantially in alinement with the conduit 8 in the point 6. Valve member 19 is preferably provided with a restriction in said conduit 20, said restriction forming a valve seat having sharp edges, as indicated at 21.

Extending throughout the solder reservoir 1 is a movable valve pin 22 provided with an enlarged conical head 23 extending rearwardly, said head 23 being of slightly smaller diameter than the interior diameter of chamber 1 adjoining the valve member 19. The conical head 23 is adapted to seat upon the sharp valve seat 21 of the valve member 19. Furthermore, the movable valve pin 22 is provided with a push rod 24 extending into the conduit 8 formed in the point 6. The movable valve pin 22 preferably passes through a suitable aperture in the transverse partition 25 of the body portion 12 and terminates in a head 26 provided with an aperture 27.

The body portion 12 is preferably provided with a transverse actuating member 28 loosely positioned in an aperture 29 formed in the side wall of the body member 12 and passing substantially diametrically across such body portion through an elongated opening 30. The actuating member 28 may then be rearwardly curved, as indicated at 31, and be provided with a suitable head or button 32. The opposite end of the actuating member 28 may be provided with a nut 33 adapted to prevent the actuating member 28 from being drawn into the body member 12.

The body member 12 may be connected to a handle 34 made of wood, composition or any other suitable material as by means of a cylindrical connecting member 35 threadedly connected to the body member 12 and suitably attached to the handle 34.

For example, the cylindrical member 35 may be provided with an extension 36 inserted in the handle 34. The connecting member 35 may be vented, as by means of a plurality of apertures 37. A collar 38 may be borne by the forward end of the handle 34, said collar 38 firmly holding one end of a spring member 39, said spring member being adapted to bear outwardly against the actuating member 31.

The spring 39 may be provided with an aperture through which a threaded shaft 40 carried by the knob or head 32 extends towards the handle 34. An adjustable knob 41 may be threadedly connected to the threaded shaft 40.

The heating element 2 may be provided with two electrical contact pins 42, the ends of the resistance wire 3 carried by the heating element 2 being connected to such pins. The body portion 12 may be provided with two complementary electrical contact means or sleeves adapted to receive the contact pins 42. Such electrical contact means or sleeves are indicated at 43 and are of a type well known in the art.

The contact means 43 may extend beyond the transverse partition 25 of the body member 12 and be there provided with suitable clips or terminals 44 to which the lead-in wires or electrical conductors 45 may be connected.

The wires 45 may pass from the body portion 12 through the connecting member 35 and sleeve 36 into a conduit 46 formed in the handle 34.

It will thus be seen that the device described hereinabove may be filled with solder through the closure 17, thus filling the solder chamber 1. When electrical connection is made, the heating element 2 will heat and melt the solder within the solder chamber 1 and simultaneously, by reason of the contact of point 6 with the heating element 2, bring the point 6 up to a high temperature. Furthermore, inasmuch as the valve member 19 is surrounded by the heating element 2, any residual solder left in the device from prior use is readily melted. By depressing button 34 the actuating member 28 is operated, imparting longitudinal motion to the valve pin 22, thus opening the valve. It is well known that solder oxidizes readily and forms dross, but the particular valve construction shown, namely, a movable valve member having an enlarged head, such as the head 23, in combination with a sharp valve seat such as the seat 21, prevents the accumulation of dross on the valve seat. Instead, the dross apparently accumulates along the movable valve pin 22 and rearwardly of the conical enlarged head 23. Only clean solder passes through the annular ring between the walls of solder chamber 1 and the enlarged head 23.

Furthermore, any accumulated dross in the conduit 8 of the point 6 is pushed, moved and easily dislodged by the plunger 24.

In actual operation the quantity of solder which it is desired to continuously feed to the point 6 of the iron may be regulated by adjusting the position of the knob 41 along the threaded shaft 40, so that in this manner the valve opening may be regulated, as the travel of the movable valve pin 22 may be thus controlled.

Furthermore, the construction defined hereinabove permits the iron to be readily disassembled for cleaning purposes. The housing 4 may be readily removed from the body portion 12 and the heating element 2 may then be moved longitudinally, withdrawing the electrical contact pins 42 from their respective contact means 43. The solder chamber 1 may then be removed by unscrewing the same from the body portion 12, thus permitting the entire forward portion of the iron to be removed from the body portion and handle without the necessity of breaking any electrical connections by hand. A reversal of these operations will, of course, permit the device to be assembled.

Although a specific form of device has been described in considerable detail, it is to be understood that numerous changes and modifications may be made in the precise arrangement of parts without departing from the scope of the invention. All such changes and modifications as come within the scope of the appended claims are embraced thereby.

I claim:

1. In a soldering iron, the combination of a soldering chamber, a point extending beyond said solder chamber but in overlapping relation thereto for a portion of its length, a conduit in said point, said conduit communicating with said solder chamber, an electrical heating element surrounding said solder chamber, a housing surrounding said heating element, means operably connected to said housing and cooperating with said point for maintaining said point in contact with said heating element, a sharp valve seat providing a restricted opening in said conduit, a body portion, means for operably connecting said housing and soldering chamber to said body portion, a conduit in said body portion communicating with said solder chamber, a removable closure to said conduit, a movable valve pin extending axially through said solder chamber and body portion conduit and adapted to cooperate with said valve seat, and means carried by said body portion for actuating said valve pin.

2. In a soldering iron, the combination of a soldering chamber, a point extending beyond said solder chamber but in overlapping relation thereto for a portion of its length, a conduit in said point, said conduit communicating with said solder chamber, an electrical heating element surrounding said solder chamber, a housing surrounding said heating element, means operably connected to said housing and cooperating with said point for maintaining said point in contact with said heating element, a sharp valve seat providing a restricted opening in said conduit, a body portion, means for operably connecting said housing and soldering chamber to said body portion, a conduit in said body portion communicating with said solder chamber, a removable closure to said conduit, a movable valve pin extending axially through said solder chamber and body portion conduit and adapted to cooperate with said valve seat, means carried by said body portion for actuating said valve pin, electrical contact pins carried by said heating element, electrical contact means carried by said body portion and adapted to slidably receive said contact pins, a handle operably connected to said body portion, and electrical conductors carried by said handle and connected to the electrical contact means carried by said body portion.

3. In an electric soldering iron, the combination of a soldering chamber, a point extending beyond said solder in overlapping relation thereto for a portion of its length, a conduit in said point communicating with said solder chamber, a bushing of non-corrosive metal within said conduit, an electrical heating element surrounding said solder chamber, a housing surrounding said heating element, means operably connected to said housing and cooperating with said point for maintaining said point in contact with said heating element, a valve member positioned within said solder chamber and point, said valve member being provided with a conduit communicating with said point conduit, a restricted sharp valve seat carried by said valve member, a body portion, means for operably connecting said housing and solder chamber to said body portion, a conduit in said body portion communicating with said solder chamber, a removable closure to said conduit, a movable valve pin extending axially through said solder chamber and body portion conduit, and adapted to cooperate with said valve seat, a push rod carried by said valve pin and extending through said valve member into said point conduit, and means carried by said body portion for actuating said valve pin.

4. In an electric soldering iron, the combination of a soldering chamber, a point extending beyond said solder chamber in overlapping relation thereto for a portion of its length, a conduit in said point communicating with said solder chamber, a bushing of non-corrosive metal within said conduit, an electrical heating element surrounding said solder chamber, a housing surrounding said heating element, means operably connected to said housing and cooperating with said point for maintaining said point in contact with said heating element, a valve member positioned within said solder chamber and point, said valve member being provided with a conduit communicating with said point conduit, a restricted sharp valve seat carried by said valve member, a body portion, means for operably connecting said housing and solder chamber to said body portion, a conduit in said body portion communicating with said solder chamber, a removable closure to said conduit, a movable valve pin extending axially through said solder chamber and body portion conduit, and adapted to cooperate with said valve seat, a push rod carried by said valve pin and extending through said valve member into said point conduit, means carried by said body portion for actuating said valve pin, electrical contact pins carried by said heating element, electrical contact means carried by said body portion and adapted to slidably receive said contact pins, a handle operably connected to said body portion by means of a vented cylindrical member, and electrical conductors carried by said handle and connected to electrical contact means carried by said body portion.

5. In an electric soldering iron, the combination of an electrically heated solder reservoir, a point in sliding engagement with the solder reservoir, a housing adapted to maintain the point in contact with the reservoir, a body portion removably connected to said housing and reservoir, a handle operably connected to said body portion, a conduit in said point communicating with said reservoir, a valve seat in said reservoir, a valve pin axially positioned and longitudinally movable in said reservoir, a transversely positioned actuating member positioned in the body portion, an operable connection between said actuating member and valve pin, a rearwardly extending extension carried by the actuating member exteriorly of said body portion and handle, and spring means carried by said handle exteriorly thereof for normally maintaining said actuating member and valve pin in closed position.

6. In an electric soldering iron, the combination of an electrically heated solder reservoir, a hollow point communicating with said reservoir and held in contact therewith, a body portion removably connected to said reservoir and provided with a transverse partition, a valve seat in said reservoir, a longitudinally movable valve pin extending through said partition into said reservoir and into operable relation with said valve seat, a handle operably connected to said body portion, a transversely positioned actuating member carried by said body portion and in operable engagement with said movable valve pin exteriorly of said reservoir, a slot in said body portion adapted to slidably receive said transverse actuating member, a rearwardly extending extension carried by said actuating member exteriorly of said body portion and handle, spring means carried by said handle exteriorly thereof and cooperating with said actuating member extension for normally maintaining said actuating member and valve pin in closed position, and means carried by said actuating member extension for adjustably limiting the travel of said actuating member and valve pin.

Signed at Los Angeles, Calif., this 12th day of May, 1930.

JOSEPH BUCCOLA.